No. 805,714. PATENTED NOV. 28, 1905.
J. L. CREVELING.
VISIBLE AND AUDIBLE SIGNAL.
APPLICATION FILED OCT. 27, 1900.
3 SHEETS—SHEET 1.
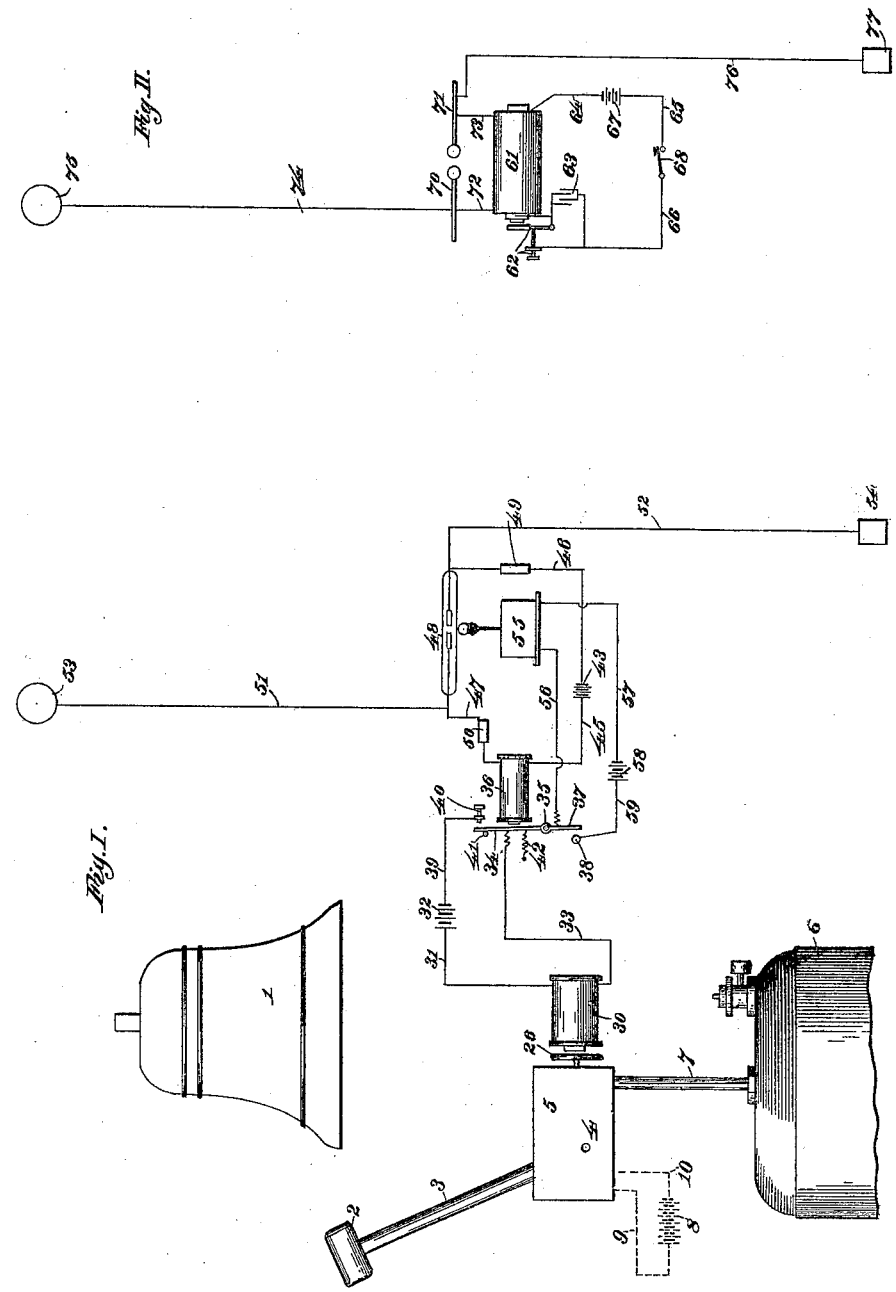

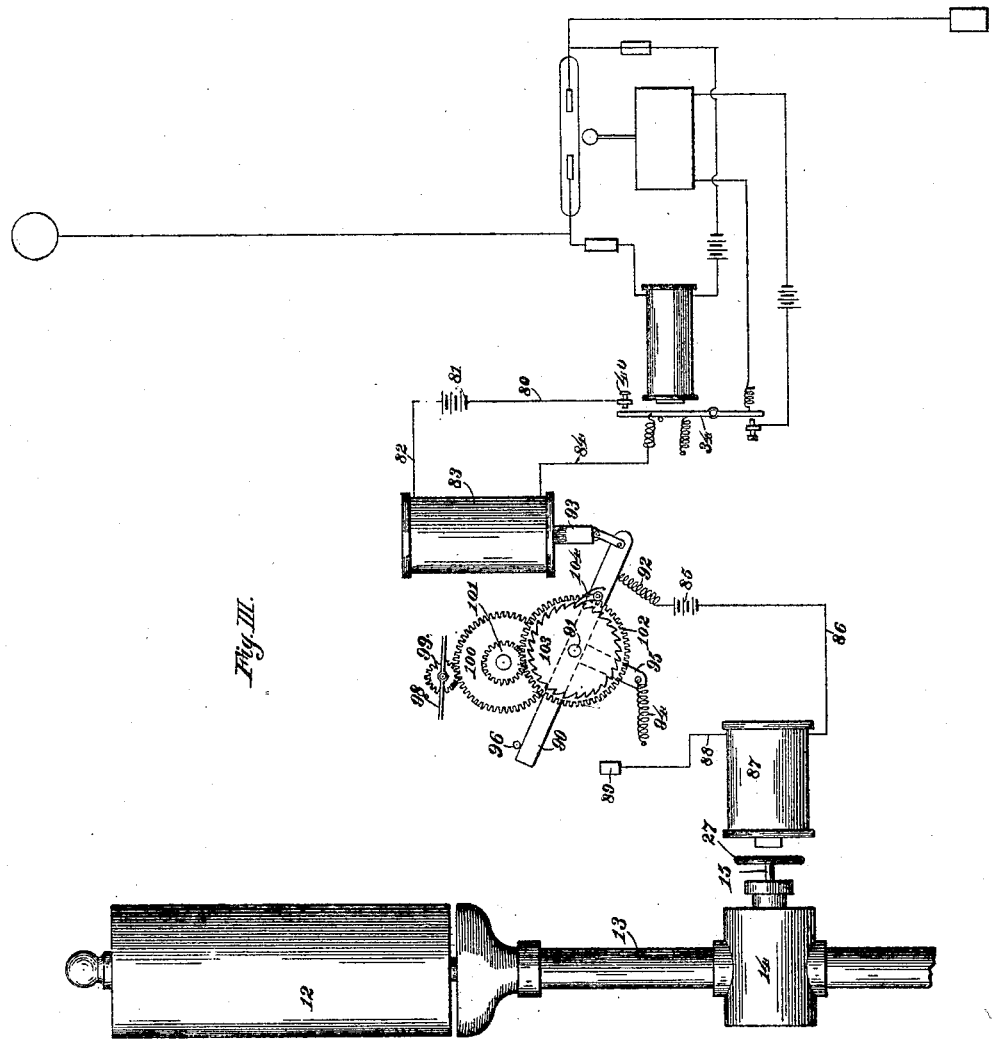

No. 805,714. PATENTED NOV. 28, 1905.
J. L. CREVELING.
VISIBLE AND AUDIBLE SIGNAL.
APPLICATION FILED OCT. 27, 1900.
3 SHEETS—SHEET 3.
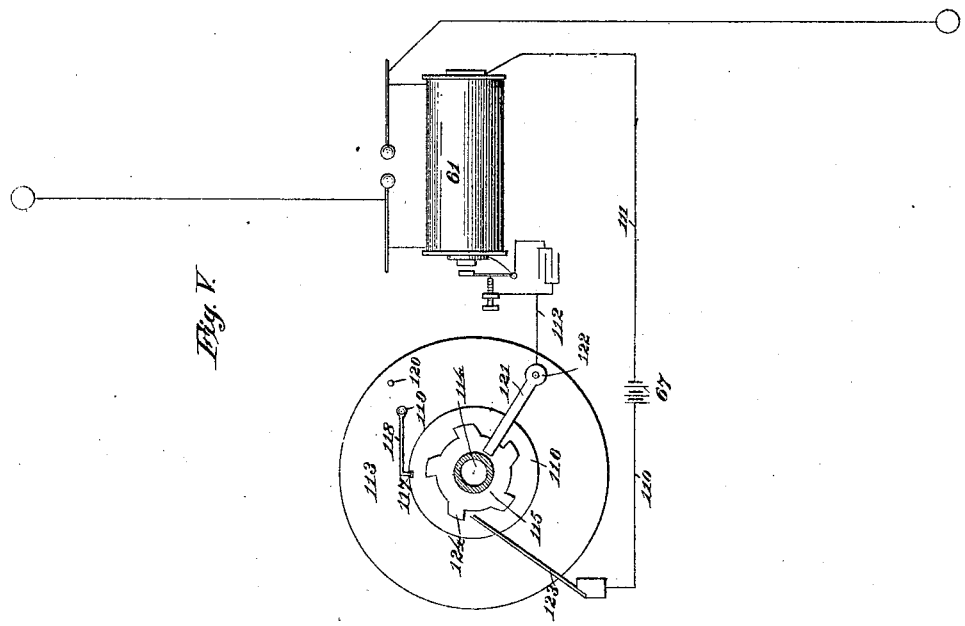
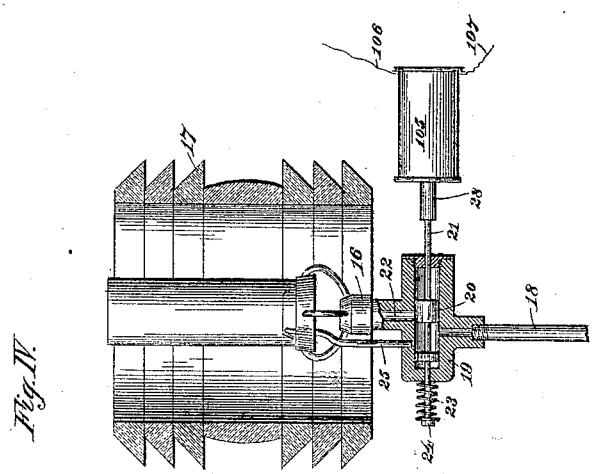

UNITED STATES PATENT OFFICE.

JOHN L. CREVELING, OF NEW YORK, N. Y.

VISIBLE AND AUDIBLE SIGNAL.

No. 805,714.          Specification of Letters Patent.          Patented Nov. 28, 1905.

Application filed October 27, 1900. Serial No. 34,579.

*To all whom it may concern:*

Be it known that I, JOHN L. CREVELING, of New York, in the county of New York, State of New York, have invented certain new and useful Improvements in Visible and Audible Signals, of which the following is a complete specification, reference being had to the accompanying drawings.

The object of my invention is to provide means for operating any form of distantly-communicative visible or audible signals at any preferred interval, determinate or indeterminate, and preferably by means wholly independent of the signal-station save as to the intervening distance.

By "distantly-communicative" signals I refer to such as the usual marine signals, which, in conjunction with my invention, are adapted to return a signal from its point of location to the point from which it is operated.

The means which I at present prefer for accomplishing the object above indicated belong to the class of electrical apparatus and comprehend such apparatus as is adapted to communicate electrical effects between distant but correlative electrical agencies unconnected by wire or other medium of communication save such as is afforded in the natural elements. Apparatus such as I have above described in general terms is made use of in what is known as the "system of wireless telegraphy," to the exciting agency of which apparatus my signal system is adapted to respond if the said apparatus be operated in a suitable manner, but which may be employed telegraphically without sounding my signal.

My invention is designed to be employed particularly for navigation purposes, the signal-station being adapted to locate, as at present, channels, shoals, &c. By employing the means contemplated by my invention for operating the signals located at different stations not only may economy of maintaining the signals be derived in connection with facility of operation, but the means of sounding such signals may be placed under control of navigators themselves, who are assisted thereby in locating signals and setting their courses.

In the accompanying drawings, Figure I is a diagrammatical view illustrating one form of signal mechanism equipped with a preferred form of electrical receiving apparatus. Fig. II is a similar view of an electrical transmitting apparatus. Fig. III is a view similar to Fig. I, illustrating a modified form of signal and a modified form of electrical receiving apparatus in connection therewith. Fig. IV is a section, partially in elevation, of a third form of signal apparatus, showing an electrically-operated prime mover for controlling its operation. Fig. V is a view similar to Fig. II, illustrating a modified form of electrical transmitting apparatus by which electrical energy is adapted to be transmitted at regular predetermined intervals.

Referring to the numerals on the drawings, 1, in Fig. I of the drawings, indicates a bell adapted to be struck, as by a hammer 2, whose supporting-shank 3 is pivoted, as indicated at 4, within a case 5. Within the case 5 hammer-actuating mechanism is provided, which may be operated by any suitable means—such, for example, as by compressed air or gas contained within a reservoir 6 and operatively communicating with the mechanism within the case, as through a pipe 7. It may be operated by energy from a storage battery 8 in electrical circuit with suitable hammer-actuating mechanism within the case 5, as through wires 9 and 10. It is deemed unnecessary to illustrate any form of hammer-actuating mechanism, since my present invention does not relate to such mechanism specifically, but only incidentally, and because various forms of such mechanisms are familiar not only in the arts generally, but particularly in signal systems.

In Fig. III in place of the bell 1 I show a whistle 12 operatively communicating, as through a pipe 13, with a source of pneumatic energy. (Not illustrated.) The pipe 13 is intercepted by a valve 14, the stem 15 of which is shown. In Fig. IV I show instead of audible signals a visible signal comprising a lamp-burner 16 and its surrounding lens 17. These may be such as are usually employed in lighthouse service. The burner is supplied with gas, as through a pipe 18, communicating with a source of supply (not illustrated) and communicating with the burner through a valve-case 19, within which works a valve 20, whose stem is normally actuated to close the passage 22 of the burner, as by a spring 23, seated at one end against a nut 24 on the end of the stem 21, which projects through the case 19, and at the other against the case. A pilot-light pipe 25 also communicates with the bore of the case 19. The pipe 25 is designed to carry a minute flame which affords means for relighting the burner 16 as often as it is supplied with gas, but which itself, although kept continuously burning, neither consumes any considerable quantity of gas nor produces appreciable illumination.

The bell 1 with its means for producing thereon an automatic signal, the whistle 12, and the burner 16 with its lens 17 are illustrated merely as examples of so many visible and audible signals to which my invention is applicable. As above stated, the employment of such signals is merely incidental to the practical operation of my invention, which may be applied to any other preferred form of visible or audible signal than that suggested in the accompanying drawings. It should be noted that in common with each signal mechanism a prime mover is employed. Such prime mover in the present preferred form of embodiment of my invention consists of an electrically-attractable member represented in Fig. I by the armature 26, in Fig. III by the armature 27, and in Fig. IV by the solenoid-core 28. The prime mover being in each instance connected with mechanism adapted to give the signal, it will appear that if it be attracted in accordance with the principle of my invention the desired object will be attained.

Referring now to Fig. I, 30 indicates an electromagnet, whose windings are connected by a wire 31 with one pole of a battery 32 and by a wire 33 yieldingly with a lever 34, pivotally mounted, as indicated at 35, in operative relations to an electromagnet 36. The lever 34 is provided with a tailpiece 37, adapted when the lever is attracted by the magnet to make contact with a contact-piece 38. At the same time the lever is adapted to complete circuit with the battery 32 through a wire 39, as through a contact-pin 40. The lever 34 is normally held against a stop-pin 41 away from the core of the magnet 36, as by a spring 42. The coils of the magnet 36 are in circuit with a battery 43 through wires 45, 46, and 47 and a coherer 48. The wires 47 and 46 are intercepted, respectively, by choking-coils 49 and 50. Adjacent to the coherer and on opposite sides thereof the wires 47 and 46 are respectively connected with wires 51 and 52. The wire 51 leads to an elevated plate or sphere 53, and the wire 52 leads to a ground connection 54. The sphere or plate 53 is in practice elevated, as by a pole of any suitable structure, considerably above the surface of the ground or water, while the wire 52 makes ground directly or through any suitable intermediate conductive medium. The structural and operative features of the coherer and choking-coils, respectively, appear to require no special description and no further illustration than that afforded in the diagram herein referred to, they being matters now of familiar knowledge in the art. It may be mentioned that the form of coherer illustrated is that known as the "Branly" coherer. The tailpiece 37 of the lever 34 is adapted to make circuit with a tapper 55 through wires 56 and 57, the battery 58, and wire 59, the wire 59 being connected with the contact-piece 38, with which the tailpiece is adapted, through the movement of the lever 34, to make contact.

Referring next to the transmitting apparatus shown in Fig. II, 61 therein indicates an ordinary induction-coil, the primary of which is in circuit with any suitable type of current-interrupter—for example, that indicated at 62 in the drawings. 63 indicates a condenser placed across the break of the current-interrupter and whose function is well understood in the art. The current through the primary of the induction-coil is made through wires 64, 65, and 66 and a battery 67. The wires 65 and 66 are disconnected, but in operative relations, through a key 68, by which the circuit through the battery 67 and the induction-coil may be completed whenever required. 70 and 71 indicate discharge knobs or balls which communicate, respectively, with the secondary terminals of the induction-coil 61, as through wires 72 and 73. The knob 70 communicates through a wire 74 with a suitable elevated capacity—for example, a metallic sphere or cylinder 75, which, like the sphere 53, is carried upon a pole or other suitable structure at a suitable height above ground, or if used on board ship it may be placed upon one of the masts. The knob 71 communicates, as through a wire 76, with the ground, (indicated at 77.) The wire 76 may be directly grounded, or if the transmitting device be used on board ship it may be connected with a plate immersed in the water or with the hull of the ship, if that be of metal.

The apparatus illustrated in Figs. I and II constituting one complete form of embodiment of my invention, it will conduce to the clearness of this specification to here describe its mode of operation. Assuming, therefore, that the signal apparatus shown in Fig. I, with the mechanism for operating its prime mover 26, is properly installed, so as to constitute, for example, a channel-marking, and that the apparatus shown in Fig. II is carried upon a vessel, when the apparatus shown in Fig. II approaches within operative distance—say, for instance, two or three miles or more, as preferred—an operator upon the vessel may at any time by depressing the key 68 cause the hammer 2 to strike the bell 1. This operation may be constantly repeated, thereby enabling the navigator of the vessel or the man upon the bridge to locate exactly the sound without that strain upon his nervous system which in the use of ordinary signals is largely responsible for errors in locating such signals. The operation of the means by which the result above specified is reached is as follows: When by depression of the key 68 the wires 66 and 65 are connected, current from the battery 67 flows through the wire 65, key 68, wire 66, interrupter 62, primary of induction-coil 61, and wire 64 to the battery. Thereupon the contact breaker or interrupter 62 and the condenser 63 coöperate to set up a rapid and high-tension-induced current in the secondary of the induction-coil 61. The knobs 70 and 71 having been properly adjusted, sparking will take place between them so long as the key 68 remains depressed. In this way electric waves or oscillations are set up which may be detected by the coherer 48, say, in passing from the wire 74, members 75 and 53, wire 51, coherer 48, and wire 52 to ground, from ground-wire 76 to knob 71, or vice versa, as the case may be. The choking-coils 49 and 50 may be inserted in the circuit of the battery 43, so as to offer an inductive resistance to the influence of the said electric waves, which of course would tend to pass through said circuit, the same being in shunt to the coherer. It is well known in the art that these electric waves would cause the resistance of the coherer to immediately fall practically to nought considering the small quantities of current which are practically employed. This diminution of resistance allows the current to flow from the battery 43 through wire 45, coils of the magnet 36, wire 47 and its coil 50, coherer 48, and wire 46 and its coil 49, to the battery. This current, exciting the magnet 36, causes it to attract the lever 34, thereby making contact with the pin 40 and completing circuit with the coils of the magnet 30 through the battery 32. The excitation of the magnet 30 causes that magnet to attract its armature 26, and thereby to actuate the hammer 2 through the agency of its mechanism controlled by its prime mover—to wit, the armature 26. The action of the magnet 36 upon the lever 34 brings the tailpiece 37 of said lever into contact with the member 38, thereby closing the tapper-circuit across the battery 58. The operation of the tapper 55 tends to cause the coherer to decohere, which it will accomplish as soon as the waves or oscillations produced, as above explained, by depression of the key 68 are interrupted.

From the foregoing description it may be seen that the depression of the key 68 will cause the bell 1 to be struck, and that upon breaking of the circuit by the key 68 the coherer will be automatically decohered and ready to receive another signal at any time and as often as desired. It may be observed in this connection that the bell could be struck rapidly by any ship in its vicinity, but that the daily consumption of the energy employed for operating the hammer-actuating mechanism would be very little, inasmuch as none would be used save when a ship was in close proximity—as, for instance, within a few miles, as specified, and calling upon the station for its signal.

It will be obvious from the foregoing description to any one skilled in the art that since the operation of the signal, so far as my invention is concerned, depends solely upon the actuation of a prime mover controlling the operation of said mechanism any other signal mechanism than that described may be substituted for the bell mechanism shown in Fig. I. For example, the whistle 12 shown in Fig. III may be substituted bodily for that shown in Fig. I; but I prefer in connection with the whistle-signal mechanism to illustrate and describe a modification of my invention, which is substantially the same as that shown in Fig. I, except that provision is made in this modified form of my invention for preventing the sounding of the signal by closing the key for brief intervals, as in transmitting the dots and dashes of telegraphy. By this means the transmitting device shown in Fig. II or any other suitable transmitting device may be employed for sending telegraphic messages without operating the signal. This is an obvious advantage, inasmuch as conditions might frequently arise in which it would be desirable to send telegraphic communications from a ship in operative proximity to a signal-station without waste of the energy in the signal-station. Referring, therefore, to Fig. III, let it be first noted that the only change made in the apparatus therein shown as distinguished from the apparatus shown in Fig. I is with respect to the circuit of the battery 32. In Fig. III in place of the battery and its circuit (shown in Fig. I) the contact-pin 40 is connected, as by a wire 80, with a battery 81, which is connected, as by a wire 82, through the wiring of the solenoid 83 with a wire 84, that is connected to the lever 34. The apparatus by which the lever 34 is actuated being identical with that shown in Fig. I and described with reference thereto is not lettered in Fig. III. 85 indicates a battery which corresponds to the battery 32 (shown in Fig. I) and which, as by a wire 86, is connected through the wiring of a magnet 87 and through a wire 88 with a contact-piece 89. 90 indicates a lever, which, pivoted, as indicated at 91, and yieldingly connected, as by a wire 92, with the pole of the battery 85 opposite to that with which the wire 86 is connected, is adapted to make and break contact with the piece 89. The lever 90 is operatively connected with the core 93 of the solenoid 83, the outward movement of which being urged, as by a spring 94, is limited by a stop-piece 96 in the path of movement of said lever. The lever is operatively connected with a train of gears with a fan or escapement represented by the fan 98, pinion 99, gear 100, pinion 101, and gear 102, the latter being mounted upon the pivot 91 of the lever 90. The means of connection between the lever 90 and its train of gears may consist, for example, of a ratchet-wheel 103, secured to the gear 102, and a pawl 104 upon the lever 90, working in engagement with the teeth of the ratchet-wheel 103.

The operation of the apparatus shown in Fig. III is as follows: Movement being imparted to the lever 34 in the manner previously described and the lever 34 being caused to make contact with the pin 40, a circuit is completed across the battery 81 through the wiring of the solenoid 83. Consequently the core 93 is attracted. The movement of the lever 90, under impulse produced by attraction of the solenoid 83 for its core 93, is retarded by intervention of the train of gears with its escapement. If the excitation of the solenoid 83 be sufficiently prolonged, the lever 90 will make contact with the piece 89, and thereby closing circuit across the battery 85 will cause the magnet 87 to attract its armature 27, which is the prime mover of the signal mechanism shown in Fig. III. On the contrary, if the excitation of the solenoid 83 be not sufficiently prolonged to close contact between the members 89 and 90 the lever 90 will immediately upon cessation of impulse from the solenoid-core 93, under impulse of its spring 94, return to engagement with its stop-pin 96, its pawl 104 slipping over the teeth of the ratchet-wheel 103. From this explanation it will be apparent that the short excitation of the solenoid occasioned by brief closures of the key 68, as in transmitting telegraphic communications, may be rendered insufficient to actuate the prime mover 27, and that prime mover will only be actuated when the operator of the key 68 holds its depressed for a sufficient and determinate interval. It may be noted also in this connection that the operation of the signal depends upon the actuation of the prime mover 27, and that the particular signal mechanism operated by such movement is immaterial. For example and by way of illustration of an additional form of signal mechanism besides that illustrated in Figs. I and III, the signal shown in Fig. IV might be substituted by merely substituting the solenoid-core 28 as a prime mover instead of the prime mover 27 and substituting the solenoid 105 for the magnet 87. The magnet 87 and solenoid 105 being analogous instrumentalities, as well understood in the art, there is no necessity for further explanation respecting it.

In the foregoing specification it is believed to have been made clear that any form of signal may be employed with either form of electrical receiving apparatus illustrated in Figs. I and III, respectively; but as these features may be important as tending to develop an enlarged variety of combination signals possible in practice, it may be well to observe that the terminals 106 and 107 of the solenoid 105 may be placed in shunt with either the magnet 30 or the magnet 87, so that a light would be produced each time the fog-signal is struck, or the fog-signal might be suppressed and the solenoid 105 substituted either for the magnet 30 or for the magnet 87.

In accordance with these suggestions either of the electrical receiving apparatus shown in Figs. I or III may be caused to operate a bell, whistle, light, or other signal or any combination of signals preferred, and either by electrical waves responding to a long impulse or to a short impulse imparted through manipulation of the key 68.

Although I regard the availability of an embodiment of my invention for placing the sounding of signals within the control of a navigator as of great importance, yet it may be used to advantage in operating a signal-station located at a point remote from shore by apparatus placed upon the shore. An advantage in my apparatus for operating such signals may be found in the convenience with which they may be operated when required and allowed to remain at rest when their warning is not needed. For operating such stations in order to emit either an audible or visible signal at predetermined intervals and for considerable periods of time the transmitting apparatus shown in Fig. V may be employed instead of that shown in Fig. II, from which it differs only in the substitution for the manually-controlled key 68 of a mechanically-actuated circuit making and breaking mechanism. In the apparatus shown in Fig. V the battery 67 is placed in circuit with the primary of the induction-coil 61, as through wires 110 111 112, the other parts of the circuit remaining the same as shown in Fig. II and described with reference thereto, the wires 110 and 112 being connected by the mechanically-actuated circuit making and breaking mechanism substituted for the key 68. That mechanism being adapted to make and break circuit at regular predetermined intervals is susceptible of wide variation as to detail. A simple form of embodiment is shown, by way of example, in Fig. V, in which—

113 indicates the frame of any suitable type of clock mechanism or other source of rotary motion, which tends to revolve the shaft 114, and with it the disks 115 and 116, secured thereto. The disk 116 is provided with a peripheral notch 117, with which a pawl 118, pivoted, as indicated at 119, to the frame 113, is adapted to engage and arrest the motion of the clock mechanism or other mechanism adapted to rotate the shaft 114. The pawl 118 may be disengaged by turning it upon its pivot 119 until it rests upon the stop-pin 120, projecting from the frame 113, when the shaft will be free to revolve for as long a period as may be desired. 121 indicates a contact-finger fixed to the frame 113, as indicated at 122, but in electrical communication only with the wire 112. The free end of the finger 121 makes electrical contact with the disk 115, with which it is in contact. 123 indicates a contact-strip that is adapted, through rotation of the disk 115, to make contact with peripheral teeth 124 thereon. When the strip 123 is in contact with a tooth 124, circuit is closed across the battery 67; but when not in contact therewith, as shown in Fig. V, the contact is broken. Consequently through the rotation of the shaft 114 the circuit may be made and broken at regular intervals, dependent upon the relative extent of the teeth 124 and the spaces which separate them, respectively, as well as the speed of rotation of the shaft 114.

With such an apparatus as that shown in Fig. V placed in a lighthouse having a keeper—as, for instance, a shore-light—the keeper may operate a distant signal, visible or audible, of any preferred characteristic, and at such intervals as may be preferred. Moreover, the employment of such an apparatus on shore will not interfere with the operation of the signal from any approaching vessel. By this means not only will the sounding of the signal from the shore apprise the navigator of the presence of the signal, but he will be at the same time able to verify and locate it through manipulation within his own control.

What I claim is—

1. The combination with a distantly-communicative signal, and local means for actuating the same, of a prime mover adapted to control the operation of said local means, and wireless telegraphic means for operatively actuating said prime mover, whereby the said signal may be operated at a point remote and detached from the point of installation of the signal.

2. As a system of signaling, the combination with a source of energy, means producing by said energy visible or audible signals, and means controlling said signal-producing means, comprehending a detector responsive to Hertzian waves or oscillations, or means of setting up Hertzian waves or oscillations controllable by the operator to whom the said signal is visible or audible.

3. The combination with a distantly-communicative signal and electrically-operative means for controlling said signal, of wireless telegraphic means adapted to operate the signal-controlling means, and means for preventing the operation of the signal-controlling means by other telegraphic impulses than those of a determinate nature.

4. The combination with a distantly-communicative signal, its actuating mechanism, and a prime mover adapted to control the movement of said actuating mechanism, of electrically-operative means for actuating the prime mover, an electric circuit adapted to operate the same, a movable member for making and breaking said circuit, and wireless telegraphic means for actuating said movable member at a point remote and detached from the point of location of said member.

5. The combination with a signal, its actuating mechanism, and a prime mover adapted to control the movement of said actuating mechanism, of electrically-operative means for actuating the prime mover, an electric circuit adapted to operate the same, a movable member for making and breaking said circuit, means for actuating said movable member at a point remote and detached from the point of location of said member, and means for retarding the movement of said movable member.

6. The combination with a prime mover, an electric circuit, comprehending instrumentalities for actuating the prime mover, and a movable member adapted to make and break said circuit, of an electromagnet adapted to actuate said movable member, in electrical circuit with a coherer, and means for operatively communicating electrical waves, generated at a distance, to said coherer, for actuating the movable member of the first-named circuit.

7. The combination with a prime mover, an electric circuit, comprehending instrumentalities for actuating the prime mover, and a movable member adapted to make and break said circuit, of an electromagnet adapted to actuate said movable member, in electrical circuit with a coherer, means for operatively communicating electrical waves, generated at a distance, to said coherer for actuating the movable member of the first-named circuit, and means for decohering the coherer.

8. The combination with a prime mover, an electric circuit comprehending instrumentalities for actuating the prime mover, and a movable member adapted to make and break said circuit, of an electromagnet adapted to actuate said movable member, in electrical circuit with a coherer, means for operatively communicating electrical waves, generated at a distance, to said coherer for actuating the movable member of the first-named circuit, and means for decohering the coherer, comprising a tapper in broken circuit with the movable member, said circuit being adapted to be closed by the movement of said member.

9. The combination with a prime mover, means for electrically actuating the same, and a broken electric circuit adapted when closed to operate said means, of a movable member adapted to make and break said circuit, retarding mechanism connected with said member, electromagnetic means for actuating said member, and means for exciting said means through electric waves generated from a point remote and detached from the point of location of said means.

10. The combination with a prime mover, means for electrically actuating the same, and a broken electrical circuit adapted when closed to operate said means, of a spring-actuated movable member, adapted to make and break said circuit, retarding mechanism comprising a ratchet-wheel supported upon the pivot of said member, and a pawl upon the member adapted to engage the teeth of the ratchet-wheel, connected with said member, electromagnetic means for actuating said member, and means for exciting said electromagnetic means through electric waves generated from a point remote and detached from the point of location of said means.

11. The combination with a distantly-communicative signal and electrically-operative means for controlling said signal, of wireless telegraphic means adapted to operate the signal-controlling means, and mechanically-actuated means for controlling the telegraphic impulses.

12. Means for transmitting distant communicative signals, means for storing energy for operating said signals combined with wireless telegraphic means for actuating said signal means.

13. The combination with means for storing a limited supply of energy, a signaling device operated by said energy, and giving distant communicative signals, of means for causing the signaling device to operate under the influence of wireless waves or impulses.

14. In combination, means for transmitting distant observable signals through natural media, means for storing a supply of energy, means for operating said transmitting means by said energy, means for causing said operating means to operate under influence of impulses or disturbances of the said natural media, and means for setting up such impulses or disturbances.

15. The combination of a station capable of sending out wireless signals or impulses, with an automatic receiving-station adapted to receive said impulses, and, under the influence of said impulse, to transmit distant communicative signals substantially as described.

In testimony of all which I have hereunto subscribed my name.

JOHN L. CREVELING.

Witnesses:
 FREDERICK E. KESSINGER,
 EDW. C. SOFIO.